(12) United States Patent
Li et al.

(10) Patent No.: US 11,432,205 B2
(45) Date of Patent: Aug. 30, 2022

(54) DATA TRANSMISSION METHOD, COMMUNICATIONS APPARATUS, AND USER PLANE FUNCTION ENTITY

(71) Applicant: HUAWEI TECHNOLOGIES CO., LTD., Guangdong (CN)

(72) Inventors: Yexing Li, Shanghai (CN); Changchun Xu, Jinan (CN); Yan Wang, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 211 days.

(21) Appl. No.: 16/944,580

(22) Filed: Jul. 31, 2020

(65) Prior Publication Data
US 2020/0367114 A1 Nov. 19, 2020

Related U.S. Application Data

(63) Continuation of application No. PCT/CN2019/071786, filed on Jan. 15, 2019.

(30) Foreign Application Priority Data
Feb. 2, 2018 (CN) .......................... 201810107022.6

(51) Int. Cl.
*H04W 36/00* (2009.01)
*H04W 36/08* (2009.01)

(52) U.S. Cl.
CPC ........ *H04W 36/0011* (2013.01); *H04W 36/08* (2013.01)

(58) Field of Classification Search
CPC . H04W 36/0011; H04W 36/08; H04W 28/12; H04W 88/08; H04W 88/18;
(Continued)

(56) References Cited

U.S. PATENT DOCUMENTS

| 2014/0133320 A1 | 5/2014 | Stark et al. |
| 2017/0031955 A1 | 2/2017 | Kenchammana-Hosekote et al. |
| 2019/0191416 A1* | 6/2019 | Xie ..................... H04W 72/042 |

FOREIGN PATENT DOCUMENTS

| CN | 103905336 A | 7/2014 |
| CN | 105978853 A | 9/2016 |

(Continued)

OTHER PUBLICATIONS

CN-109548089-A (Google Translated) (Year: 2022).*
(Continued)

*Primary Examiner* — Chi H Pham
*Assistant Examiner* — Ji-Hae Yea
(74) *Attorney, Agent, or Firm* — Fish & Richardson P.C.

(57) ABSTRACT

This application provides a data transmission method, a communications apparatus, and a session management function entity. The method includes obtaining, by a communications apparatus, a correspondence between a quality of service flow identifier of a service flow and an inter-packet time interval of the service flow. The method also includes establishing, by the communications apparatus based on the correspondence, a gate queue used to send a data packet. The method further includes establishing a mapping relationship between the gate queue and the quality of service flow identifier. The method also includes receiving, by the communications apparatus, a data packet from an upper-level sending device of a transmission link. The method further includes if the data packet includes the quality of service flow identifier, periodically scheduling, by the communications apparatus, the data packet based on the gate queue to which the quality of service flow identifier is mapped.

18 Claims, 9 Drawing Sheets

(58) Field of Classification Search
CPC ....... H04L 47/24; H04L 43/026; H04L 47/56; H04L 47/6215; H04L 67/14

See application file for complete search history.

(56) References Cited

FOREIGN PATENT DOCUMENTS

| CN | 107018542 A | | 8/2017 |
|---|---|---|---|
| CN | 107332877 A | | 11/2017 |
| CN | 109548089 A | * | 3/2019 |
| WO | 2018177277 A1 | | 10/2018 |

OTHER PUBLICATIONS

3GPP TS 43.064 V13.1.0 (Feb. 2016), "3rd Generation Partnership Project;Technical Specification Group GSM/EDGE Radio Access Network; General Packet Radio Service (GPRS); Overall description of the GPRS radio interface; Stage 2 (Release 13)," Feb. 2016, 114 pages.

Nokia, Nokia Shanghai Bell (Rapporteur), "23.501: Editorial corrections and EN Removal," SA WG2 Meeting #124, S2-179096, Reno, Nevada, USA, Nov. 27-Dec. 1, 2017, 159 pages.

Office Action issued in Chinese Application No. 201810107022.6 dated Feb. 19, 2021, 5 pages.

Extended European Search Report issued in European Application No. 19747478.6 dated Jan. 29, 2021, 10 pages.

Nokia et al., "23.501: Editorial corrections and EN Removal," SA WG2 Meeting # SA WG2 Meeting #124, S2-179619, Reno, Nevada, Nov. 27-Dec. 1, 2017, 160 pages.

3GPP TS 23.501 V15.0.0 (Dec. 2017), "3rd Generation Partnership Project; Technical Specification Group Services and System Aspects; System Architecture for the 5G System; Stage 2 (Release 15)," Dec. 2017, 181 pages.

LG Electronics, "TS 23.502: PDU session modification with QoS update," SA WG2 Meeting #120, S2-172082, Busan, South Korea, Mar. 27-31, 2017, 6 pages.

ETRI, "TS 23.502: Updating PDU session modification for UE requested QoS control," SA WG2 Meeting #122-bis, S2-176484, Sophia Antipolis, France, Aug. 21-25, 2017, 4 pages.

PCT International Search Report and Written Opinion issued in International Application No. PCT/CN2019/071786 dated Feb. 27, 2019, 13 pages (with English translation).

\* cited by examiner

DATA TRANSMISSION METHOD, COMMUNICATIONS APPARATUS, AND USER PLANE FUNCTION ENTITY

CROSS-REFERENCE TO RELATED APPLICATIONS

This application is a continuation of International Application No. PCT/CN2019/071786, filed on Jan. 15, 2019, which claims priority to Chinese Patent Application No. 201810107022.6, filed on Feb. 2, 2018. The disclosures of the aforementioned applications are hereby incorporated by reference in their entireties.

TECHNICAL FIELD

The present invention relates to the field of communications technologies, and in particular, to a data transmission method, a communications apparatus, and a user plane function entity.

BACKGROUND

In some industrial application scenarios, in addition to latency and reliability requirements, a jitter requirement is also added to communication requirements, to describe an end-to-end latency change. Jitter indicates a fluctuation magnitude, with a specified range, of a period during which a message is transmitted from a transmit end to a receive end. In a communication process, some instructions need to periodically arrive at the receive end. Therefore, when a data packet including such instructions is periodically sent, a difference between periods during which data packets are transmitted from the transmit end to the receive end is required to be relatively small. The difference between periods even reaches millisecond-level jitter.

In an existing 3rd generation partnership project (3GPP) network, jitter is not considered in quality of service (QoS) guarantee. In the prior art, it can only ensure that an end-to-end latency is not greater than a relatively large value, but cannot ensure that the end-to-end latency is within a small interval that is specific and precise. For a single data packet, an end-to-end latency of the data packet includes a processing latency at a node, a queuing latency of the data packet, a sending latency of a transmitter at the node, and a transmission latency on a link between the node and a receive end. The processing latency, sending latency, and transmission latency are relatively fixed. However, a quantity of data packets in a queue is not fixed. Consequently, the queuing latency of the data packet is also not deterministic, and there may be a relatively great fluctuation. As a result, the end-to-end latency fluctuates greatly, and jitter cannot be ensured.

SUMMARY

A technical problem to be resolved in embodiments of this application is to provide a data transmission method, a user plane function entity, and a base station, to resolve a problem that an existing end-to-end latency fluctuates greatly and jitter cannot be ensured.

According to a first aspect, an embodiment of this application provides a data transmission method. The method includes:

First, a communications apparatus obtains a correspondence between a quality of service flow identifier of a service flow and an inter-packet time interval of the service flow.

Then the communications apparatus may establish, based on the correspondence, a gate queue used to send a data packet, and establish a mapping relationship between the gate queue and the quality of service flow identifier.

In this way, when receiving a data packet from an upper-level sending device of a transmission link, the communications apparatus may detect the data packet and determine whether the data packet includes the quality of service flow identifier; and if the data packet includes the quality of service flow identifier, the communications apparatus may determine, based on the quality of service flow identifier, the gate queue to which the identifier is mapped, and then periodically schedule the data packet by using the gate queue to which the identifier is mapped.

After the communications apparatus establishes the corresponding gate queue based on the foregoing correspondence, when receiving the data packet including the QFI, the communications apparatus may select, based on the QFI, the corresponding gate queue to periodically schedule and send the data packet, to implement a deterministic queuing latency, obtain ideal jitter parameter data, and ensure stability and reliability of data transmission.

In a possible implementation, the communications apparatus may be a user plane function entity, the upper-level sending device may be a base station, and in this case, the transmitted data packet is an uplink data packet; and that a communications apparatus obtains a correspondence between a quality of service flow identifier of a service flow and an inter-packet time interval of the service flow includes:

the communications apparatus receives the correspondence from a session management function entity.

The UPF establishes an uplink gate queue to shape the uplink data packet sent by the base station and periodically schedule and send the uplink data packet, to ensure that the uplink data packet periodically and accurately arrives at a receive end device.

In a possible implementation, the communications apparatus may be a base station, the upper-level sending device may be a user plane function entity, and in this case, the transmitted data packet may be a downlink data packet.

The base station establishes a downlink gate queue to shape the downlink data packet forwarded by the UPF and periodically schedule and send the downlink data packet, to ensure that the downlink data packet periodically and accurately arrives at a receive end device.

In a possible implementation, if base station handover needs to be performed and the base station is a source base station during the base station handover, that a communications apparatus obtains a correspondence between a quality of service flow identifier of a service flow and an inter-packet time interval of the service flow includes: The source base station may receive the correspondence from an access and mobility management function entity; and then the source base station sends the correspondence to a target base station.

When base station handover occurs, the source base station may send the correspondence to the target base station, so that the target base station may establish the corresponding downlink gate queue to ensure periodic scheduling and sending of the downlink data packet.

In a possible implementation, if base station handover needs to be performed and the base station is a target base station during the base station handover, that a communications apparatus obtains a correspondence between a quality of service flow identifier of a service flow and an inter-packet time interval of the service flow includes: The target base station receives the correspondence from a source base station.

According to a second aspect, an embodiment of this application provides a data transmission method. The method includes:

A session management function entity first obtains subscription information of a terminal device from a unified data management entity, where the subscription information includes an inter-packet time interval of a service flow.

Then the session management function entity may allocate a quality of service flow identifier to the service flow, and establish a correspondence between the quality of service flow identifier and the inter-packet time interval.

After the correspondence is established, the session management function entity may send the correspondence to a communications apparatus, where the correspondence is used to periodically schedule a data packet.

In a possible implementation, the communications apparatus may be a base station; and when the session management function entity sends the correspondence to the communications apparatus, if the communications apparatus is the base station, the session management function entity may send the correspondence to the base station through an access and mobility management function entity.

In a possible implementation, the communications apparatus may be a user plane function entity.

In a possible implementation, the user plane function entity may be a target user plane function entity, and before the session management function entity sends the correspondence to the communications apparatus, the method further includes:

the session management function entity receives, from an access and mobility management function entity, a request for reselecting a user plane function entity; and then the session management function entity selects the target user plane function entity; and that the session management function entity sends the correspondence to a communications apparatus includes:

the session management function entity sends the correspondence to the target user plane function entity.

According to a third aspect, an embodiment of this application provides a communications apparatus. The apparatus includes:

a transceiver unit, configured to obtain a correspondence between a quality of service flow identifier of a service flow and an inter-packet time interval of the service flow; and a processing unit, configured to: establish, based on the correspondence, a gate queue used to send a data packet, and establish a mapping relationship between the gate queue and the quality of service flow identifier, where the transceiver unit is further configured to receive a data packet from an upper-level sending device of a transmission link; and if the data packet includes the quality of service flow identifier, the processing unit is further configured to periodically schedule the data packet based on the gate queue to which the quality of service flow identifier is mapped.

In a possible implementation, the communications apparatus is a user plane function entity, the upper-level sending device is a base station, and the data packet is an uplink data packet; and the transceiver unit is specifically configured to receive the correspondence from a session management function entity.

In a possible implementation, the communications apparatus is a base station, the upper-level sending device is a user plane function entity, and the data packet is a downlink data packet.

In a possible implementation, if base station handover needs to be performed and the base station is a source base station during the base station handover, the transceiver unit is specifically configured to receive the correspondence from an access and mobility management function entity; and the transceiver unit is further configured to send the correspondence to a target base station.

In a possible implementation, if base station handover needs to be performed and the base station is a target base station during the base station handover, the transceiver unit is specifically configured to receive the correspondence from a source base station.

According to a fourth aspect, an embodiment of this application provides a session management function entity. The session management function entity includes:

a transceiver unit, configured to obtain subscription information of a terminal device from a unified data management entity, where the subscription information includes an inter-packet time interval of a service flow; and a processing unit, configured to: allocate a quality of service flow identifier to the service flow, and establish a correspondence between the quality of service flow identifier and the inter-packet time interval, where the transceiver unit is further configured to send the correspondence to a communications apparatus, where the correspondence is used to periodically schedule a data packet.

In a possible implementation, the communications apparatus is a base station; and the transceiver unit is specifically configured to send the correspondence to the base station through an access and mobility management function entity.

In a possible implementation, the communications apparatus is a user plane function entity, In a possible implementation, the user plane function entity is a target user plane function entity, and before the transceiver unit sends the correspondence to the communications apparatus, the transceiver unit is further configured to receive, from an access and mobility management function entity, a request for reselecting a user plane function entity; and the processing unit is further configured to select the target user plane function entity; and the transceiver unit is further configured to send the correspondence to the target user plane function entity.

According to a fifth aspect, an embodiment of this application provides a data transmission system. The system includes:

the communications apparatus according to any one of the third aspect or the implementations of the third aspect; and the session management function entity according to any one of the fourth aspect or the implementations of the fourth aspect.

According to a sixth aspect, an embodiment of this application provides a communications apparatus. The apparatus includes:

a processor, a memory, an interface circuit, and a bus, where the processor, the memory, and the interface circuit are connected and communicate with each other by using the bus; the memory is configured to store a set of program code; and the processor is configured to invoke the program code stored in the memory, to perform the steps according to any one of the first aspect or the implementations of the first aspect in the embodiments of this application.

According to a seventh aspect, an embodiment of this application provides a session management function entity. The session management function entity includes:

a processor, a memory, an interface circuit, and a bus, where the processor, the memory, and the interface circuit are connected and communicate with each other by using the bus; the memory is configured to store a set of program code; and the processor is configured to invoke the program code stored in the memory, to perform the steps according to any one of the second aspect or the implementations of the second aspect in the embodiments of this application.

According to an eighth aspect, an embodiment of this application provides a computer-readable storage medium. The computer-readable storage medium stores an instruction; and when the instruction is run on a computer, the computer is enabled. to perform the method according to any one of the first aspect or the implementations of the first aspect in the embodiments of this application.

According to a ninth aspect, an embodiment of this application provides a computer-readable storage medium. The computer-readable storage medium stores an instruction; and when the instruction is run on a computer, the computer is enabled to perform the method according to any one of the second aspect or the implementations of the second aspect in the embodiments of this application.

BRIEF DESCRIPTION OF DRAWINGS

To describe technical solutions in embodiments of this application or the prior art more clearly, the following briefly describes the accompanying drawings required for describing the embodiments.

DESCRIPTION OF EMBODIMENTS

The following clearly and completely describes technical solutions in embodiments of this application with reference to the accompanying drawings in the embodiments of this application. Clearly, the described embodiments are merely some but not all of the embodiments of this application. All other embodiments obtained by a person of ordinary skill in the art based on the embodiments of this application without creative efforts shall fall within the protection scope of this application.

Figure 1:
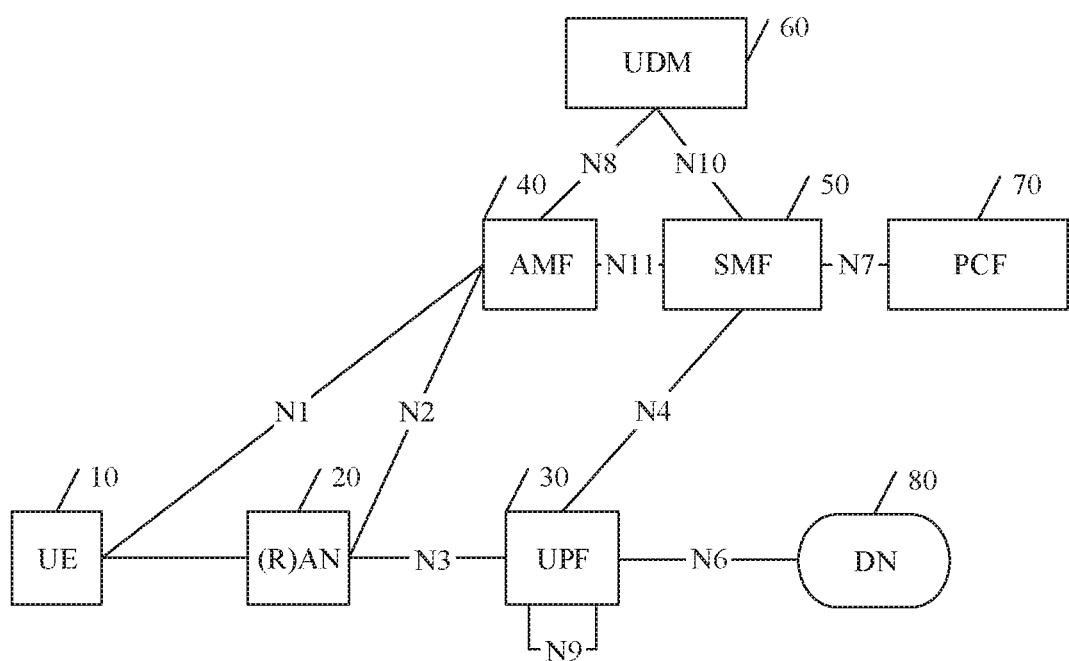
FIG. 1 is a schematic diagram of a system architecture to which a data transmission method is applied according to an embodiment of this application.

FIG. 1 is a schematic diagram of a system architecture to which a data transmission method according to an embodiment of this application is applied. The system architecture is a typical system structure in a 5th generation mobile communications technology (5G). In the system architecture, reference points of N1 to N27 (FIG. 1 shows the reference points of N1 to N11) are defined, and the following network element function entities are defined.

An access and mobility management function (AMF) 40 is configured for access and mobility management of UE.

A data network (DN) 80 includes, for example, an operator service, an interact access service, and a third-party service.

A policy control function (PCF) 70 is configured to formulate a QoS policy of a service.

A session management function (SMF) 50 is configured for session establishment, deletion, modification, and the like.

Unified data management (UDM) 60 is configured to store subscription data of user equipment and the like.

A user plane function (UPF) 30 is configured to forward a data packet.

User equipment (UE) 10 may also be referred to as a terminal or a terminal device, and is a device that provides a user with voice and/or data connectivity, for example, a handheld device having a wireless connection function, or another processing device connected to a wireless modem decoder.

A (radio) access network ((R)AN) 20 is configured to enable a terminal to access a wireless network. The access network device includes but is not limited to an evolved NodeB (eNB), a radio network controller (RNC), a NodeB (NB), a base station controller (BSC), a base transceiver station (BTS), a home base station (for example, a home evolved NodeB or a home NodeB, FINB), a baseband unit (BBU), a Wi-Fi access point (AP), or the like. For ease of description, the foregoing devices are collectively referred to as a base station 20 in this application. The base station 20 may provide a network signal for the terminal, and is responsible for sending downlink data to the terminal or sending uplink data of the terminal.

Function entities mainly involved in the embodiments of this application include the UE 10, the (R)AN 20, the UPF 30, the AMF 40, the SMF 50, and the UDM 60.

Function entities involved in data packet forwarding include the UPF 30 and the base station, that is, the (R)AN 20. In an existing data transmission method, a queuing latency of a data packet is not deterministic, and consequently an end-to-end latency fluctuates greatly. In the embodiments of this application, corresponding gate queues are established on the UPF 30 and the (R)AN 20, to periodically schedule transmitted data packets, so as to ensure determinism of the end-to-end latency and obtain ideal jitter parameter data.

The following describes in detail the data transmission method in this application with reference to FIG. 2 to FIG. 7.

Figure 2:
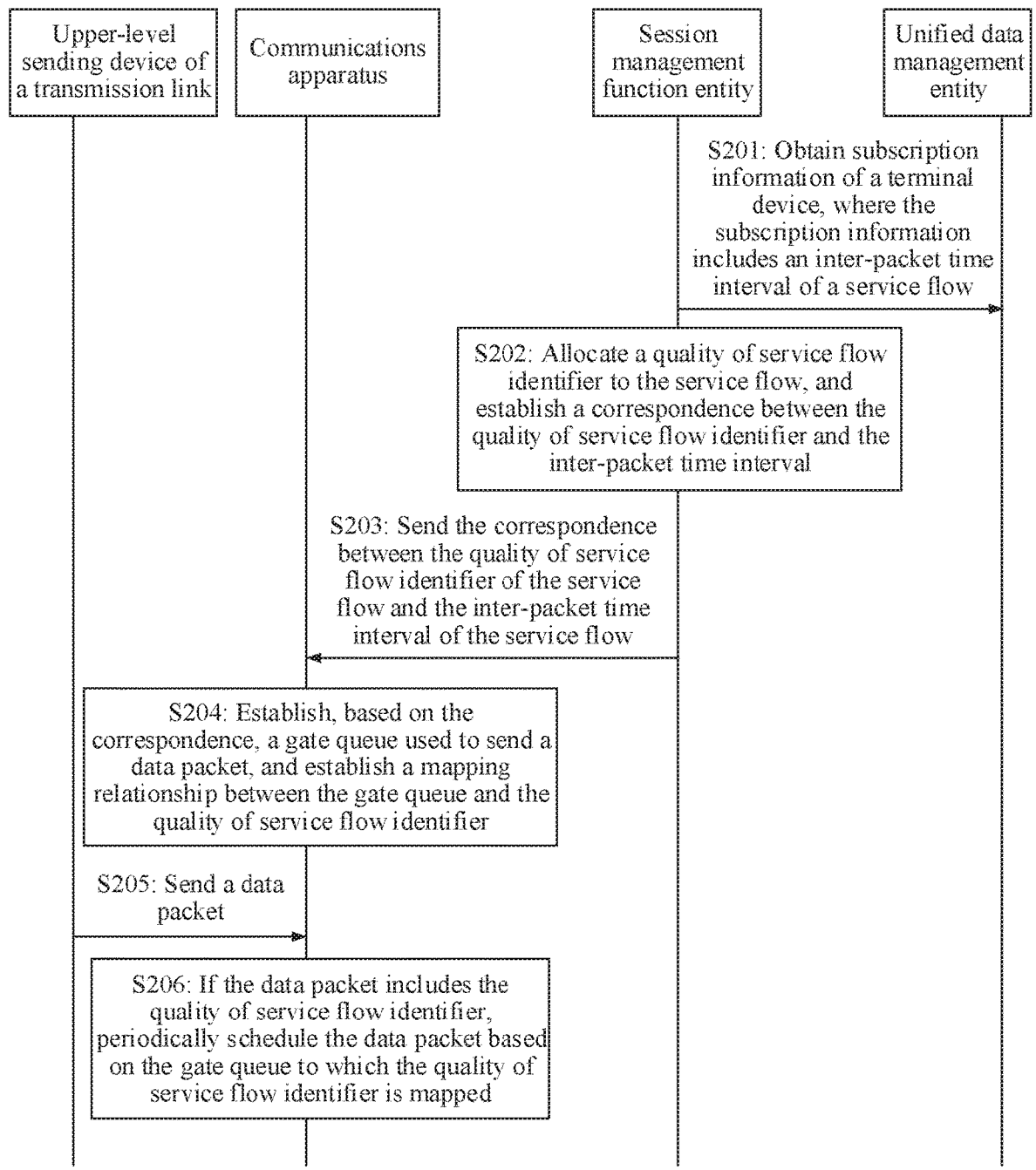
FIG. 2 is a schematic flowchart of a data transmission method according to an embodiment of this application.

FIG. 2 is a schematic flowchart of a data transmission method according to an embodiment of this application. The method may be applied to a process of establishing a packet data unit (PDU) session, and specifically includes the following steps.

S201: A session management function entity obtains subscription information of a terminal device from a unified data management entity, where the subscription information includes an inter-packet time interval of a service flow For example, the session management function network element may be the SMF 50 in FIG. 1. The unified data management entity may be the UDM 60 in FIG. 1.

For example, the SMF 50 requests subscription information from the UDM 60, and obtains an inter-packet interval of a service flow from the subscription information returned by the UDM 60.

The inter-packet time interval is a period during which a transmit end device periodically sends a data packet to a next-level receiving device of a transmission link. For example, in uplink, a UPF 30 may be the transmit end device, and the next-level receiving device may be a next-hop forwarding device of the transmission link, such as a switch or a router. In this case, the inter-packet time interval is a time interval at which the UPF 30 sends an uplink data packet to the next-hop forwarding device. In downlink, a base station 20 may be the transmit end device, and the next-level receiving device may be UE 10. In this case, the inter-packet time interval is a time interval at which the base station 20 sends a downlink data packet to the UE 10.

An uplink service flow and a downlink service flow are independent of each other. Therefore, an inter-packet time interval of an uplink data packet and an inter-packet time interval of a downlink data packet are also independent of each other.

Optionally, to obtain a relatively accurate end-to-end latency and relatively accurate jitter data, the inter-packet time interval may be accurate to a microsecond (μs) level, in other words, the inter-packet time interval is measured in microseconds.

S202: The session management function entity allocates a quality of service flow identifier (QoS flow identifier, QFI) to the service flow, and establishes a correspondence between the quality of service flow identifier and the inter-packet time interval.

The QFI may be used as an identifier of a data packet related to the service flow. The SMF 50 may allocate a QFI to the service flow In a transmission process of a data packet related to the service flow, the LW 30 or the base station 20 may obtain the QFI and encapsulate the QFI into the data packet related to the service flow. A correspondence between the Q11 and the inter-packet time interval is generated by the SMF 50.

S203: The session management function entity sends, to a communications apparatus, the correspondence between the quality of service flow identifier (QFI) of the service flow and the inter-packet time interval of the service flow Correspondingly, the communications apparatus obtains the correspondence between the quality of service flow identifier (QFI) of the service flow and the inter-packet time interval of the service flow.

S204: The communications apparatus establishes, based on the correspondence, a gate queue used to send a data packet, and establishes a mapping relationship between the gate queue and the quality of service flow identifier.

S205: An upper-level sending device of a transmission link sends a data packet to the communications apparatus.

S206: If the data packet includes the quality of service flow identifier, the communications apparatus periodically schedules the data packet based on the gate queue to which the quality of service flow identifier is mapped.

The gate queue is used to shape and periodically send the data packet.

Optionally, because application scenarios are different and transmission may be uplink transmission or downlink transmission, communications apparatuses are different, and manners of obtaining the correspondence between the QFI and the inter-packet time interval by the communications apparatuses are also different.

For example, the UPF 30 is used as a last-hop transmit end device of an uplink data packet in a mobile access network, and an uplink gate queue may be established on the UPF 30. In other words, the communications apparatus may be the UPF 30, The uplink gate queue may be used to periodically open and close a gate, A periodicity from opening to closing the gate may be determined based on an inter-packet time interval. In this way, when the gate is opened, the uplink data packet in the uplink gate queue can be sent; when the gate is closed, the uplink data packet cannot be sent. An uplink data packet queue is shaped through periodic opening and closing of the gate, to implement a deterministic queuing latency.

For another example, the base station 20 is used as a last-hop transmit end device of a downlink data packet in a mobile access network, and a downlink gate queue may be established on the base station 20. In other words, the communications apparatus may be the base station 20. A downlink gate queue may be used to periodically open and close a gate. A periodicity from opening to closing the gate may be determined based on an inter-packet time interval. In this way, When the gate is opened, the downlink data packet can be sent; when the gate is closed, the downlink data packet cannot be sent. A downlink data packet queue is shaped through periodic opening and closing of the gate, to implement a deterministic queuing latency.

Alternatively, in a base station handover scenario, if a source base station already obtains the correspondence between the QFI and the inter-packet time interval, the source base station may send the correspondence to a target base station when handover to the target base station is performed. Therefore, the target base station can complete establishment of a downlink gate queue and mapping between the downlink gate queue and the QFI. In this case, the communications apparatus may be the target base station. In this way, after the base station handover is completed, when receiving a downlink data packet including the QFI, the target base station can also periodically schedule and send the downlink data packet.

Alternatively, when base station handover is performed, if the target base station further initiates a UPF reselection request, the SMF 50 may reselect a UPF 30, and the SMF 50 sends the correspondence between the QFI and the inter-packet time interval to the target UPF, and therefore the target UPF can complete establishment of an uplink gate queue and mapping between the uplink gate queue and the QFI. In this case, the communications apparatus may be the target UPF. In this way, after the base station handover involving UPF reselection is completed, when receiving an uplink data packet including the QFI, the target UPI can also periodically schedule and send the uplink data packet.

It should be noted that the data transmission method in this embodiment of this application is not only applicable to a mobile network, but also applicable to another application scenario in which a closed loop message needs to be transmitted and it needs to be ensured that the message periodically arrives at a receive end. According to the method in this embodiment of this application, the gate queue for shaping the data packet may be configured at a last-hop sending node of data transmission based on the inter-packet time interval, and the gate is periodically opened and closed to ensure the deterministic queuing latency; and a measurement unit at a corresponding level is used to implement accurate jitter parameter data.

Alternatively, when the foregoing method is applied to a PDU session establishment process, if UE 10 initiates a PDU session establishment request to an AMF 40, an SWF 50 receives the PDU session establishment request sent by the AMF 40, and sends a subscription information request to a UDM 60. The SWF 50 receives a subscription information response returned by the UDM 60, where the subscription information response includes an inter-packet time interval of a service flow; and then the SMF 50 allocates a quality of service flow identifier (QFI) to the service flow, and establishes a correspondence between the QFI and the inter-packet time interval.

After the correspondence between the QFI and the inter-packet time interval is established, the SMF 50 may send a session establishment request or a session modification request to a UPF 30, where the session establishment request or the session modification request carries the correspondence between the QFI and the inter-packet time interval, so that the UPF 30 establishes an uplink gate queue based on the correspondence between the QFI and the inter-packet time interval and establishes a mapping relationship between the uplink gate queue and the QFI. In addition, the SMF 50 may alternatively send a PDU session establishment response to the AMF 40, where the PDU session establishment response carries the correspondence between the QFI and the inter-packet time interval, so that the AMF 40 sends, to a base station 20, a PDU session establishment request carrying the correspondence between the QFI and the inter-packet time interval, and the base station 20 establishes a downlink gate queue based on the correspondence between the QFI and the inter-packet time interval and a mapping relationship between the downlink gate queue and the QFI.

Figure 3A:
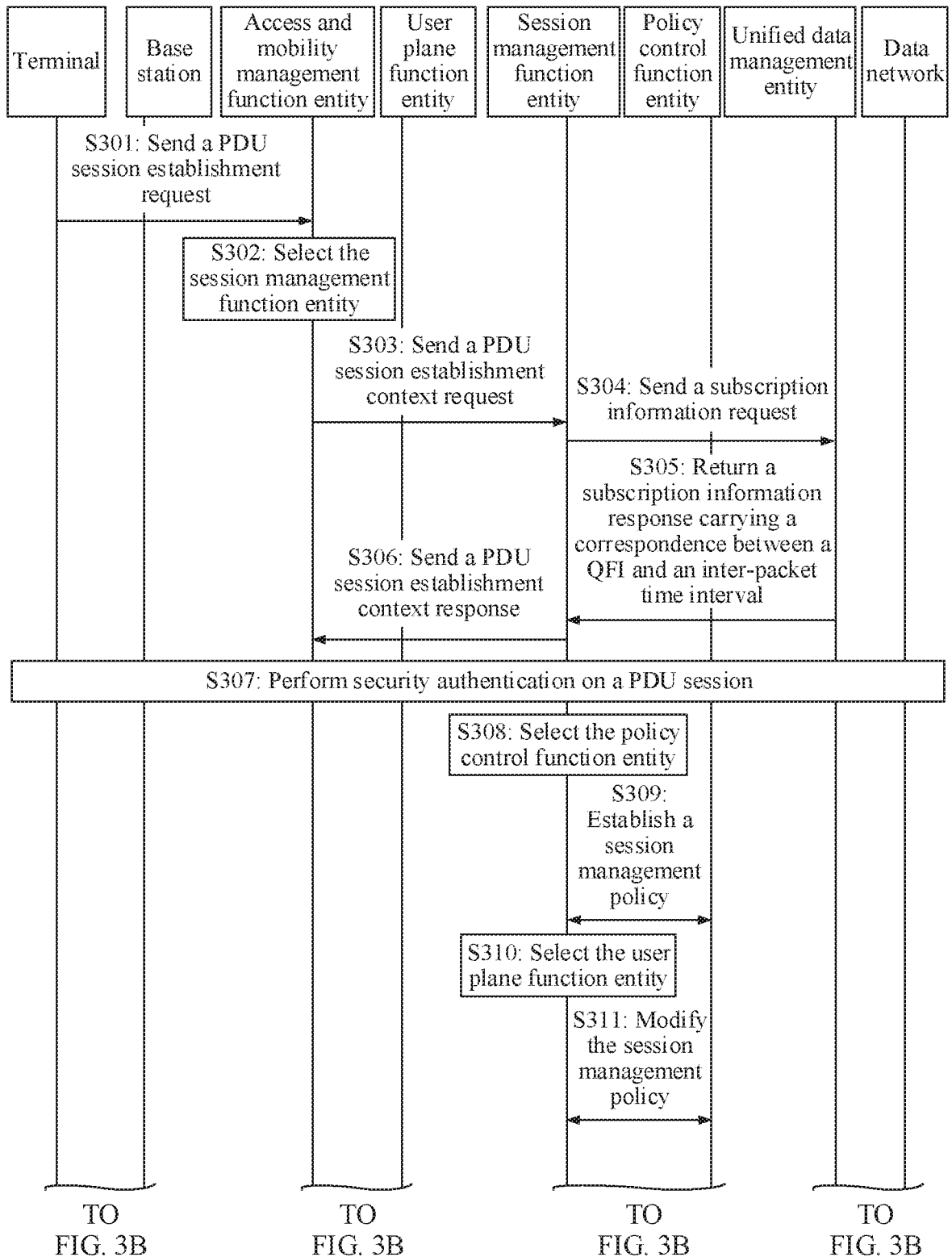
FIG. 3A and FIG. 3B are a schematic flowchart of another data transmission method according to an embodiment of this application.
Figure 3B:
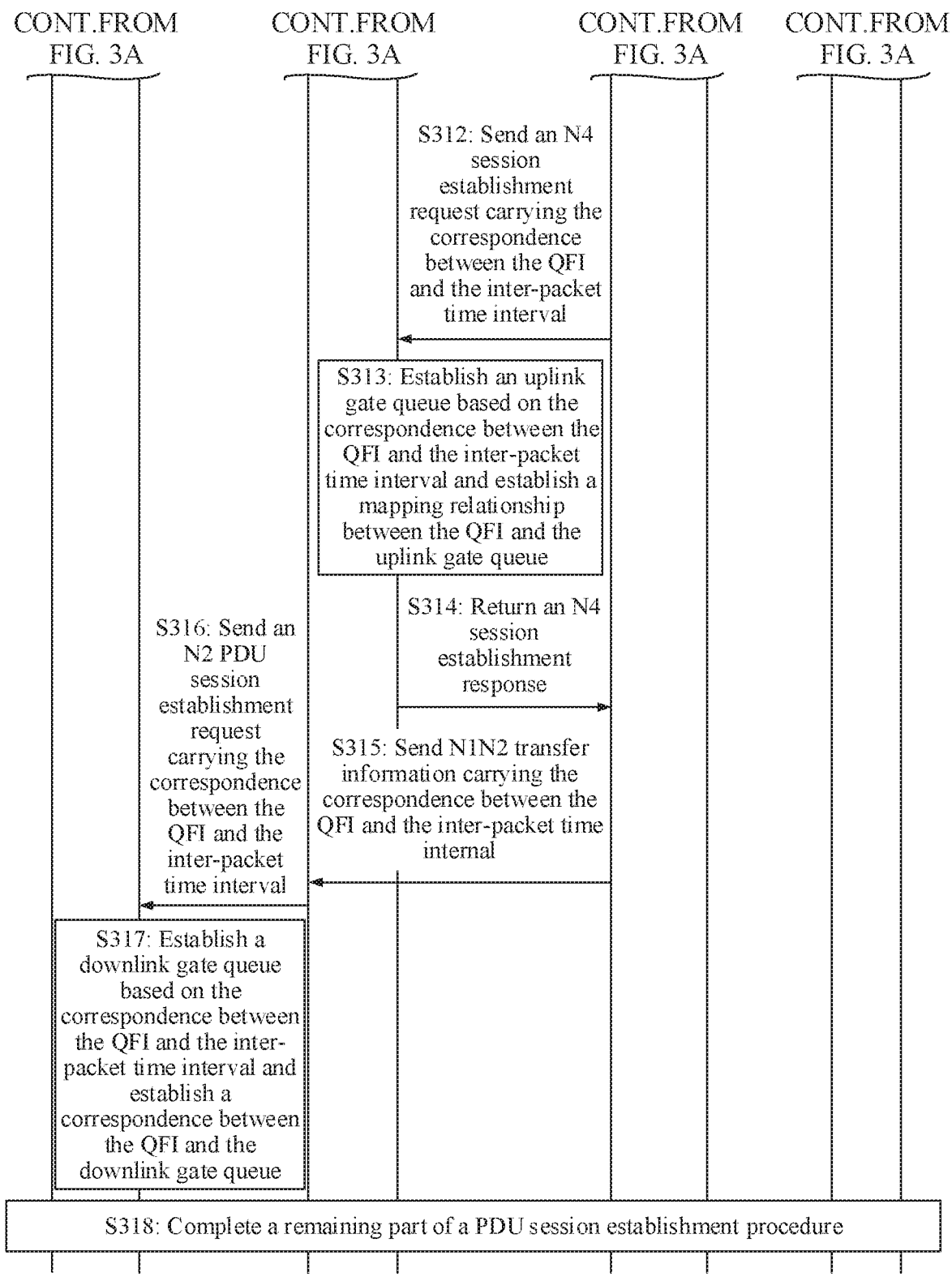

For an entire detailed procedure, further refer to FIG. 3A and FIG. 3B, FIG. 3A and FIG. 3B are a schematic flowchart of another data transmission method according to an embodiment of this application. The method specifically includes the following steps.

S301: A terminal sends a PDU session establishment request to an access and mobility management function entity.

S302: The access and mobility management function entity selects a session management function entity.

S303: The access and mobility management function entity sends a PDU session establishment context request to the session management function entity.

S304: The session management function entity sends a subscription information request to a unified data management entity.

S305: The unified data management entity returns a subscription information response, where the subscription information response carries a correspondence between a QFI and an inter-packet time interval.

S306: The session management function entity sends a PDU session establishment context response to the access and mobility management function entity.

S307: Perform security authentication on a PDU session.

S308: The session management function entity selects a policy control function entity.

S309: The session management function entity and the policy control function entity establish a session management policy.

Optionally, the SMF initiates a session management policy establishment request to the PCF. In this case, the PCF returns a default policy and charging control (PCC) rule to the SMF, including a bandwidth, a 5G quality of service identifier (5G QoS identifier, 5QI), and the like.

It should be noted that if the two network elements already establish a session management policy, the interaction procedure herein may alternatively be that the SMF sends a session management policy modification request to the PCF, to modify the established session management policy.

S310: The session management function entity selects a user plane function entity.

S311: The session management function entity and the policy control function entity modify the session management policy.

Optionally, after the session management function entity selects the user plane function entity, if a dynamic PCC rule is set in a system, in step S311, the SMF may report some subscription information to the PCF. The PCF generates a dynamic PCC rule based on the subscription information and returns the dynamic PCC rule to the SMF. The PCF delivers the PCC rule obtained after modification to the SMF, including a bandwidth and a 5QI.

The session management function entity sends a session establishment request to the user plane function entity, and the session establishment request carries the correspondence between the QFI and the inter-packet time interval.

S312: The session management function entity sends an N4 session establishment request to the user plane function entity, where the N4 session establishment request carries the correspondence between the QFI and the inter-packet time interval.

S313: The user plane function entity establishes an uplink gate queue based on the correspondence between the QFI and the inter-packet time interval, and establishes a mapping relationship between the QFI and the uplink gate queue.

S314: The user plane function entity returns an N4 session establishment response to the session management function entity.

S315: The session management function entity sends an N1N2 transfer message to the access and mobility management function entity, where the N1N2 transfer message carries the correspondence between the QFI and the inter-packet time interval.

S316: The access and mobility management function entity sends an N2 PDU session establishment request to a base station, where the N2 PDU session establishment request carries the correspondence between the QFI and the inter-packet time interval.

S317: The base station establishes a downlink gate queue based on the correspondence between the QFI and the inter-packet time interval and establishes a mapping relationship between the QFI and the downlink gate queue.

S318: Complete a remaining part of a PDU session establishment procedure.

When the UPF and the (R)AN, that is, the base station, obtain the correspondence between the QFI of a service flow and the inter-packet time interval of the service flow, the UPF and the (R)AN each may establish a gate queue, and establish a mapping relationship between the gate queue and the QFI. When a corresponding data packet is received, the data packet may be shaped, to implement periodic scheduling.

For example, the inter-packet time interval of the data packet is 10,000 microseconds (μs), a size of the data packet is 100 bytes (byte), and the gate queue used for data packet shaping can accommodate a maximum of 200 data packets at the same time. After receiving the data packet, the gate queue buffers the data packet, and may send a data packet every 10,000 μs. Certainly, the periodic scheduling herein may alternatively be: set a periodicity slightly greater than the inter-packet time interval, to implement setting of the gate queue and opening and closing of a gate. This is not limited in this embodiment of this application.

In addition, it should be noted that when data packets of a plurality of service flows need to be transmitted, corresponding gate queues may be separately selected for different data packets based on QFIs corresponding to the service flows, to perform parallel processing. When a processing capability of a device is insufficient, corresponding gate queues may be sequentially selected based on priorities or latency requirements of services, to perform sequential processing; or a task may be migrated to another node device, a related correspondence between a QFI and an inter-packet time interval is sent to the node device, and the node device completes periodic scheduling transmission. This is not limited in this embodiment of this application.

Optionally, when the communications apparatus is a user plane function entity, in a base station handover scenario including UPF reselection, the user plane function entity is a target user plane function entity obtained after the UPF reselection. For example, after receiving a UPF reselection request from the AMF, the SMF selects a target UPF, and the SMF sends the correspondence between the QFI and the inter-packet time interval to the target UPF, so that the target UPF establishes an uplink gate queue based on the correspondence between the QFI and the inter-packet time interval, and establishes a mapping relationship between the uplink gate queue and the QFI.

Figure 4:
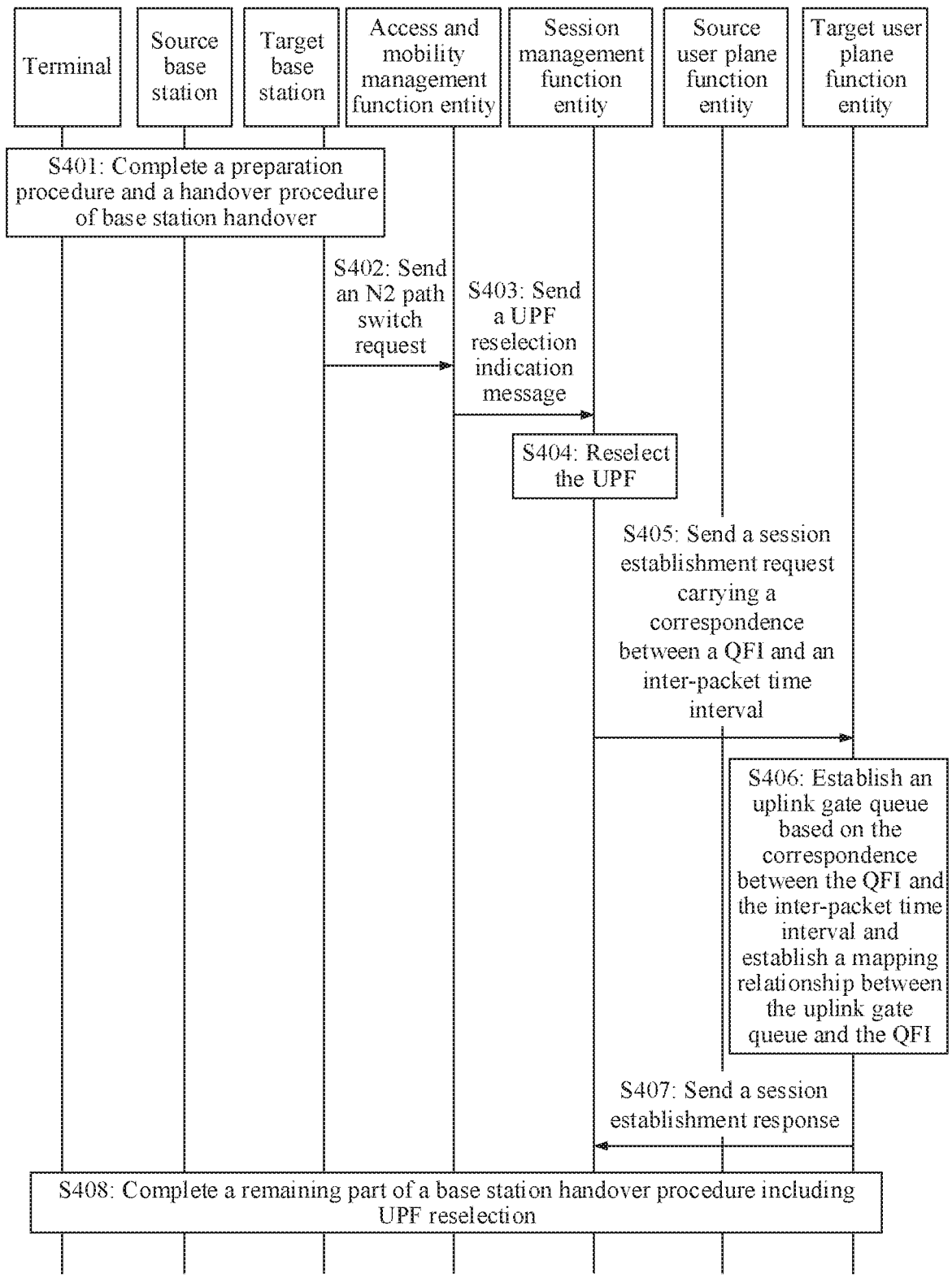
FIG. 4 is a schematic flowchart of still another data transmission method according to an embodiment of this application.

For a specific procedure, refer to FIG. 4. The procedure includes the following steps.

S401: A terminal, a source base station (source RAN), and a target base station (target RAN) complete a preparation procedure and a handover procedure of base station handover.

Specifically, some processes such as measurement configuration, handover decision, and handover request and response may be included. Details are not described herein. After step S401, the procedure further includes:

S402: The target base station sends an N2 path switch request to an access and mobility management function entity.

S403: The access and mobility management function entity sends a user plane function entity reselection indication message to a session management function entity.

S404: The session management function entity reselects a user plane function entity.

S405: The session management function entity sends a session establishment request to the target user plane function entity (target UPF), where the session establishment request carries a correspondence between a QFI and an inter-packet time interval.

S406: The target user plane function entity establishes an uplink gate queue based on the correspondence between the QFI and the inter-packet time interval, and. establishes a mapping relationship between the uplink gate queue and the QFI.

S407: The target user plane function entity sends a session establishment response to the SMF.

S408: Complete a remaining part of a base station handover procedure including user plane function entity reselection.

If the target base station initiates a UPF reselection request after the base station handover, the SMF sends a session establishment request carrying the correspondence between the QFI and the inter-packet time interval to the target UPF, so that the target UPF can establish a corresponding uplink gate queue based on the received correspondence between the QFI and the inter-packet time interval, and establish a mapping relationship between the uplink gate queue and the QFI. When an uplink data packet needs to be transmitted, the target UPF may also shape the uplink data packet, to implement periodic scheduling.

Optionally, after obtaining the foregoing correspondence, the source UPF before the base station handover and the target UPF after the base station handover and the UPF reselection each can periodically schedule and send the uplink data packet in an uplink scenario, a base station receives an uplink data packet from a terminal, and the base station may determine a data radio bearer (DRB) based on a packet data convergence protocol (PDCP) entity and determine a QFI based on a correspondence between the DRB and the QFI. Then, the base station may encapsulate the QFI into the uplink data. packet sent by the terminal.

Figure 5:
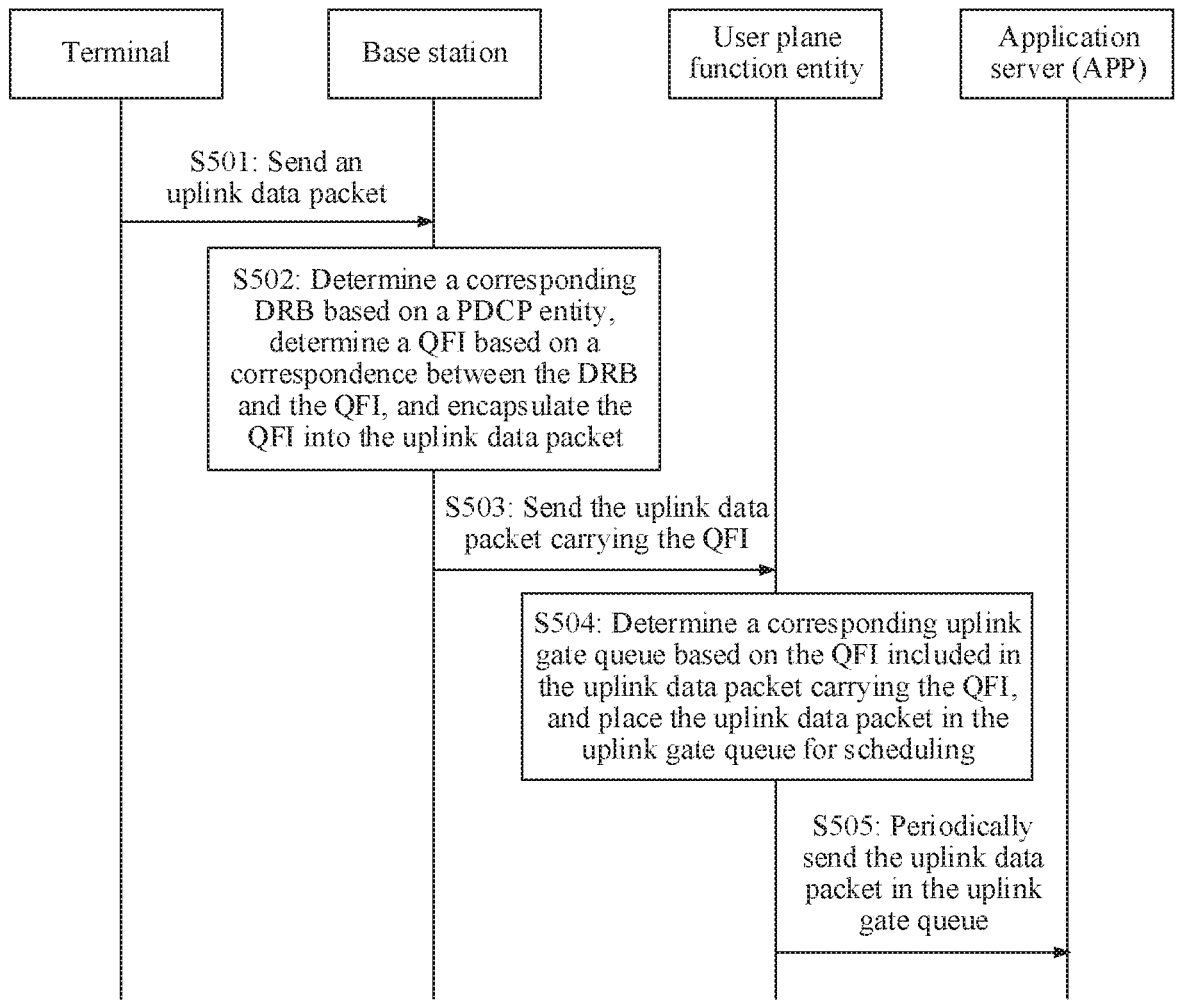
FIG. 5 is a schematic flowchart of still another data transmission method according to an embodiment of this application.

For a specific procedure, refer to FIG. 5. FIG. 5 is a schematic flowchart of still another data transmission method according to an embodiment of this application. The method includes the following steps.

S501: UE sends an uplink data packet to a base station.

S502: The base station determines a corresponding DRB based on a PDCP entity, determines a QFI based on a correspondence between the DRB and the QFI, and encapsulates the QFI into the uplink data packet.

S503: The base station sends, to a UPF, the uplink data packet carrying the QFI.

S504: The UPF determines a corresponding uplink gate queue based on the QFI included in the uplink data packet carrying the QFI, and places the uplink data packet in the uplink gate queue for scheduling.

S505: The UPF periodically sends the uplink data packet in the uplink gate queue to an application server (APP server).

After obtaining the correspondence, the UPF may obtain an inter-packet time interval based on the correspondence, then configure the corresponding uplink gate queue based on the inter-packet time interval and set a quantity of uplink data packets that can be accommodated in the uplink gate queue and a periodicity from opening to closing a gate by the uplink gate queue. For example, the inter-packet time interval of the uplink data packet is 10,000 microseconds (μs), a size of the uplink data packet is 100 bytes (byte), and the UPF configures that the uplink gate queue used for uplink data packet shaping can accommodate a maximum of 200 data packets at the same time. After receiving the uplink data packet, the UPF buffers the uplink data packet in the uplink gate queue, and then may periodically schedule and send the uplink data packet based on a sending periodicity determined based on the inter-packet time interval. For example, the UPF sends an uplink data packet every 10,000 μs. Certainly, periodic scheduling herein may alternatively be: set a periodicity slightly greater than the inter-packet time interval to implement setting of the uplink gate queue and opening and closing of the gate. This is not limited in this embodiment of this application.

Therefore, it is ensured that the uplink data packet periodically and accurately arrives at a receive end device.

Optionally, when the communications apparatus is a base station, in a handover scenario, the base station is a target base station after handover. For example, a source base station may send a handover request to the target base station, where the handover request includes the correspondence between the QFI and the inter-packet time interval, so that the target base station establishes a downlink gate queue based on the correspondence between the QFI and the inter-packet time interval, and establishes a mapping relationship between the downlink gate queue and the QFI.

Figure 6:
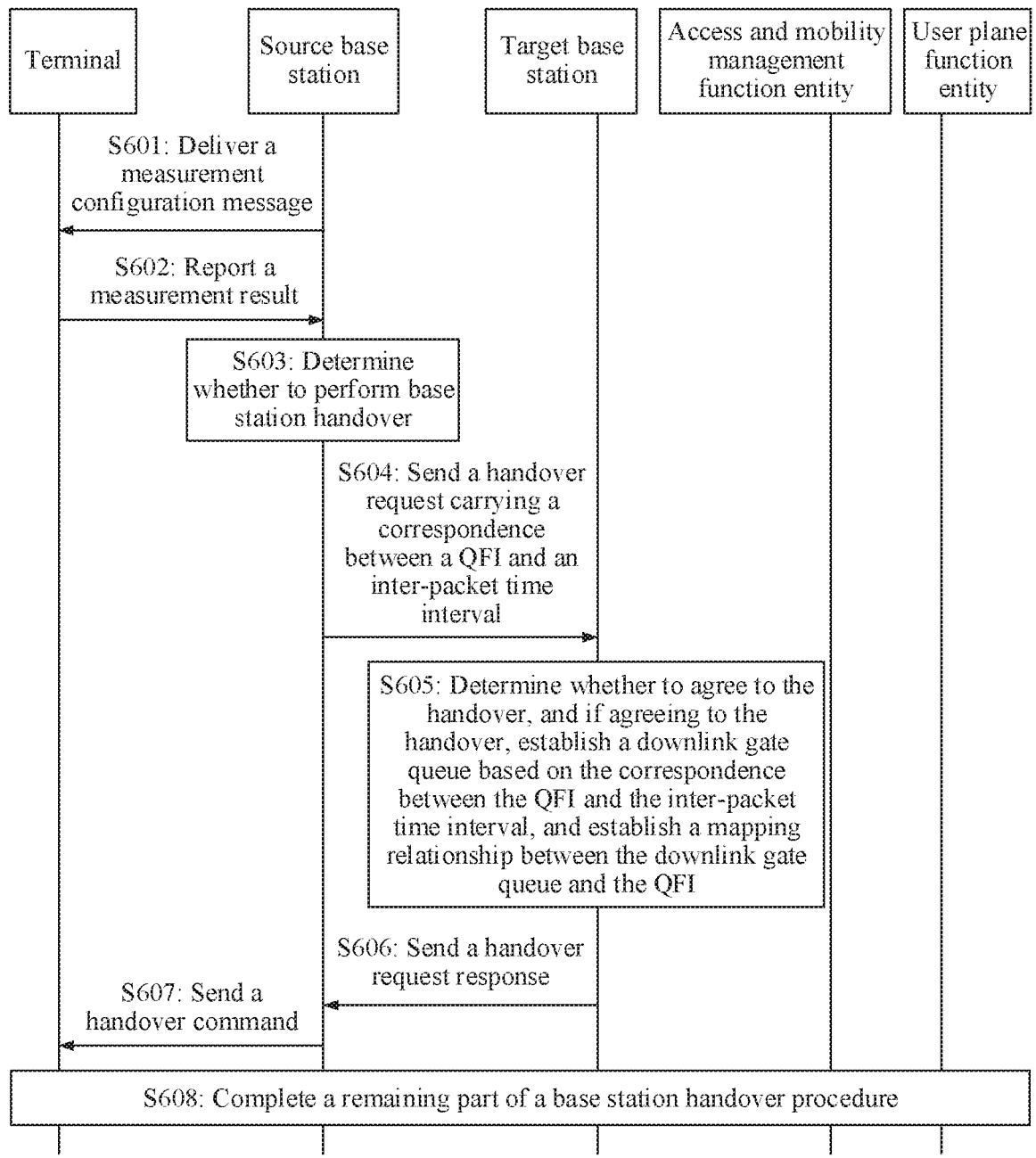
FIG. 6 is a schematic flowchart of still another data transmission method according to an embodiment of this application.

For a specific procedure, refer to FIG. 6. The procedure includes the following steps, S601: A source base station delivers a measurement configuration message to a terminal.

S602: The terminal reports a measurement result to the source base station,

S603: The source base station determines, based on the measurement result reported by the UR, whether to perform base station handover. If a result obtained through determining is that base station handover needs to be performed, a subsequent step is performed.

S604: The source base station sends a handover request to a target base station, where the handover request includes a correspondence between a QFI and an inter-packet time interval.

S605: The target base station determines whether to agree to the handover, and if the target base station agrees to the handover, the target base station establishes a downlink gate queue based on the correspondence between the QFI and the inter-packet time interval, and establishes a mapping relationship between the downlink gate queue and the QFI.

S606: The target base station sends a handover request response to the source base station.

S607: The source base station sends a handover command to the terminal.

S608: Complete a remaining part of a base station handover procedure.

In a base station handover process, the source RAN sends, to the target RAN, the handover request carrying the correspondence between the QFI and the inter-packet time interval, so that the target RAN after the handover can establish the corresponding downlink gate queue and establish the mapping relationship between the downlink gate queue and the QFI. When a downlink data packet needs to be transmitted, the target RAN may shape the downlink data packet, to implement periodic scheduling.

After obtaining the foregoing correspondence, the source base station before the base station handover and the target base station after the base station handover each can periodically schedule and send the downlink data packet. In a downlink scenario, optionally, after receiving a downlink data packet sent by an application server, a UPF may determine a QFI based on a service data flow filter (SDF), and then the UPF encapsulates the QFI into the downlink data packet sent by the application server.

Figure 7:
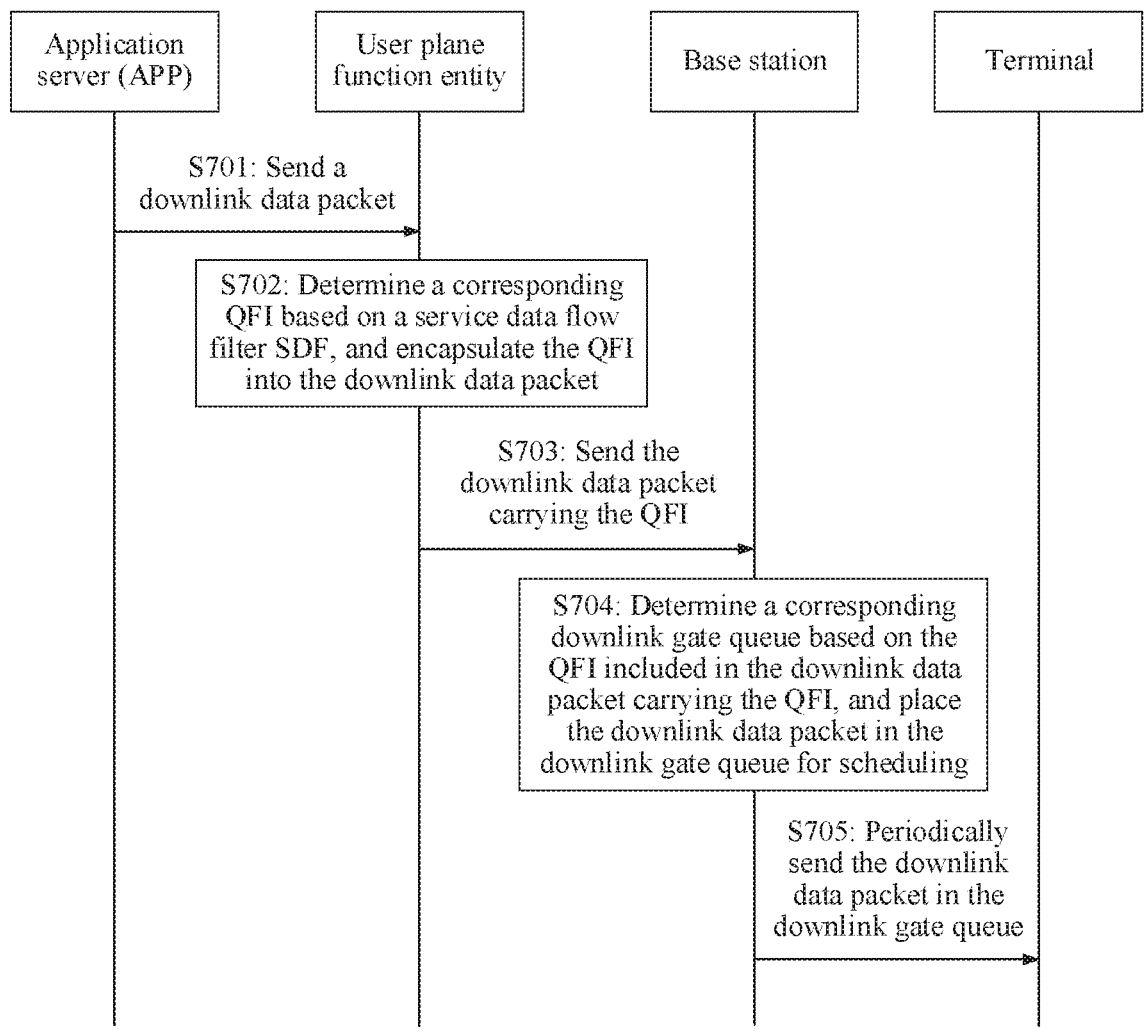
FIG. 7 is a schematic flowchart of still another data transmission method according to an embodiment of this application.

For a specific procedure, refer to FIG. 7. FIG. 7 is a schematic flowchart of still another data transmission method according to an embodiment of this application. The method includes the following steps.

S701: An application server (APP server) sends a downlink data packet to a user plane function entity.

S702: The user plane function entity determines a corresponding QFI based on a service data flow filter SDF, and encapsulates the QFI into the downlink data packet.

S703: The user plane function entity sends, to a base station, the downlink data packet carrying the QFI.

S704: The base station determines a corresponding downlink gate queue based on the QFI included in the downlink data packet carrying the QFI, and places the downlink data packet in the downlink gate queue for scheduling.

S705: The base station periodically sends, to a terminal, the downlink data packet in the downlink gate queue.

After obtaining the correspondence, the base station may obtain an inter-packet time interval based on the correspondence, then configure the corresponding downlink gate queue based on the inter-packet time interval, and set a quantity of downlink data packets that can be accommodated in the downlink gate queue and a periodicity from opening to closing a gate by the downlink gate queue. For example, the inter-packet time interval of the downlink data packet is 10,000 microseconds ($\mu s$), a size of the downlink data packet is 100 bytes (byte), and the base station configures that the downlink gate queue used for downlink data packet shaping can accommodate a maximum of 200 downlink data packets at the same time. After receiving the downlink data packet, the base station buffers the downlink data packet in the downlink gate queue, and then may periodically schedule and send the downlink data packet based on a sending periodicity determined based on the inter-packet time interval. For example, the base station sends a downlink data packet every 10,000 $\mu s$. Certainly, periodic scheduling herein may alternatively be: set a periodicity slightly greater than the inter-packet time interval to implement setting of the downlink gate queue and opening and closing of the gate. This is not limited in this embodiment of this application.

In this way, it is ensured that the downlink data packet periodically and accurately arrives at a receive end device.

Figure 8:
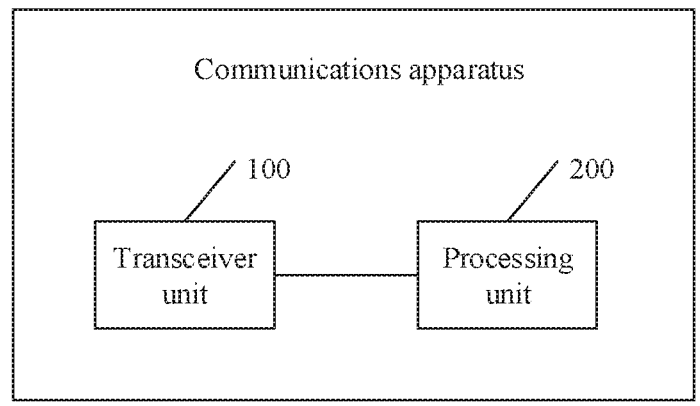
FIG. 8 is a schematic composition diagram of a communications apparatus according to an embodiment of this application.

FIG. 8 is a schematic composition diagram of a communications apparatus according to an embodiment of this application. In this embodiment, the communications apparatus includes:

a transceiver unit 100, configured to obtain a correspondence between a quality of service flow identifier of a service flow and an inter-packet time interval of the service flow; and a processing unit 200, configured to establish, based on the correspondence, a gate queue used to send a data packet, and establish a mapping relationship between the gate queue and the quality of service flow identifier, where the transceiver unit 100 is further configured to receive a data packet from an upper-level sending device of a transmission link and if the data packet includes the quality of service flow identifier, the processing unit 200 is further configured to periodically schedule the data packet based on the gate queue to which the quality of service flow identifier is mapped.

Optionally, the communications apparatus is a user plane function entity, the upper-level sending device is a base station, and the data packet is an uplink data packet; and the transceiver unit 100 is specifically configured to receive the correspondence from a session management function entity.

Optionally, the communications apparatus is a base station, the upper-level sending device is a user plane function entity, and the data packet is a downlink data packet.

Optionally, if base station handover needs to be performed and the base station is a source base station during the base station handover, the transceiver unit 100 is specifically configured to receive the correspondence from an access and mobility management function entity; and the transceiver unit 100 is further configured to send the correspondence to a target base station.

Optionally, if base station handover needs to be performed and the base station is a target base station during the base station handover, the transceiver unit 100 is specifically configured to receive the correspondence from a source base station.

In an embodiment of the communications apparatus in this application, the communications apparatus may perform any operation of the UPF in FIG. 3A and FIG. 3B, the target UPF in FIG. 4, or the UPF in FIG. 5. In another embodiment of the communications apparatus in this application, the communications apparatus may perform any operation of the base station in FIG. 3A and FIG. 3B, the target base station in FIG. 6, or the base station in FIG. 7.

Figure 9:
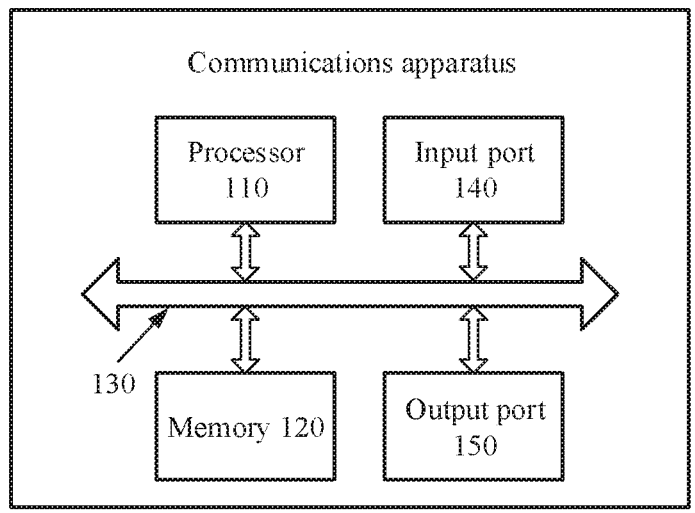
FIG. 9 is a schematic composition diagram of another communications apparatus according to an embodiment of this application.

FIG. 9 is a schematic composition diagram of another communications apparatus according to an embodiment of this application. The communications apparatus may include a processor 110, a memory 120, and a bus 130. The processor 110 and the memory 120 are connected by using the bus 130. The memory 120 is configured to store an instruction. The processor 110 is configured to execute the instruction stored in the memory 120, to implement any operation of the UPF in FIG. 3A and FIG. 3B, the target UPF in FIG. 4, or the UPF in FIG. 5, or any operation of the base station in FIG. 3A and FIG. 3B, the target base station in FIG. 6, or the base station in FIG. 7.

The apparatus may further include an input port 140 and an output port 150. The processor 110, the memory 120, the input port 140, and the output port 150 may be connected by using the bus 130.

The processor 110 is configured to execute the instruction stored in the memory 120, to control the input port 140 to receive a signal, control the output port 150 to send a signal, and complete the steps performed by the apparatus in the foregoing methods. The input port 140 and the output port 150 may be a same physical entity or different physical entities. When the input port 140 and the output port 150 are the same physical entity, the input port 140 and the output port 150 may be collectively referred to as an input/output port. The memory 120 may be integrated into the processor 110, or may be separated from the processor 110.

In an implementation, it may be considered that functions of the input port 140 and the output port 150 are implemented by using a transceiver circuit or a dedicated transceiver chip. It may be considered to implement the processor 110 by using a dedicated processing chip, a processing circuit, a processor, or a general-purpose chip.

In another implementation, it may be considered to implement the apparatus provided in this embodiment of this application by using a general-purpose computer. To be specific, program code that is used to implement functions of the processor 110, the input port 140, and the output port 150 is stored in the memory, and a general-purpose processor implements the functions of the processor 110, the input port 140, and the output port 150 by executing the code in the memory.

For concepts, explanations, detailed descriptions, and other steps of the apparatus that are related to the technical solutions provided in this embodiment of this application, refer to the descriptions of the content in the foregoing methods or other embodiments. Details are not described herein again.

Figure 10:
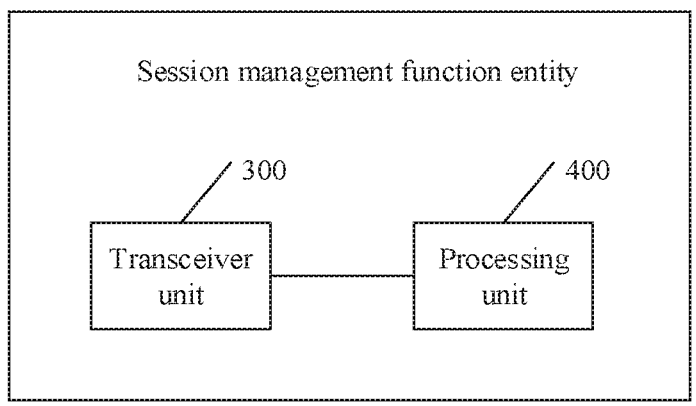
FIG. 10 is a schematic composition diagram of a session management function entity according to an embodiment of this application.

FIG. 10 is a schematic composition diagram of a session management function entity according to an embodiment of this application. In this embodiment, the session management functional entity includes:

a transceiver unit 300, configured to obtain subscription information of a terminal device from a unified data management entity, where the subscription information includes an inter-packet time interval of a service flow; and a processing unit 400, configured to: allocate a quality of service flow identifier to the service flow, and establish a correspondence between the quality of service flow identifier and the inter-packet time interval, where the transceiver unit 300 is further configured to send the correspondence to a communications apparatus, where the correspondence is used to periodically schedule a data packet.

Optionally, the communications apparatus is a base station; and the transceiver unit 300 is specifically configured to send the correspondence to the base station through an access and mobility management function entity.

Optionally, the communications apparatus is a user plane function entity,

Optionally, the user plane function entity is a target user plane function entity, and before the transceiver unit 300 sends the correspondence to the communications apparatus, the transceiver unit 300 is further configured to receive, from an access and mobility management function entity, a request for reselecting a user plane function entity; and the processing unit 400 is further configured to select the target user plane function entity; and the transceiver unit 300 is further configured to send the correspondence the target user plane function entity.

In addition, the session management function entity in FIG. 10 may further perform another operation in FIG. 2 to FIG. 4. Details are not described herein again.

Figure 11:
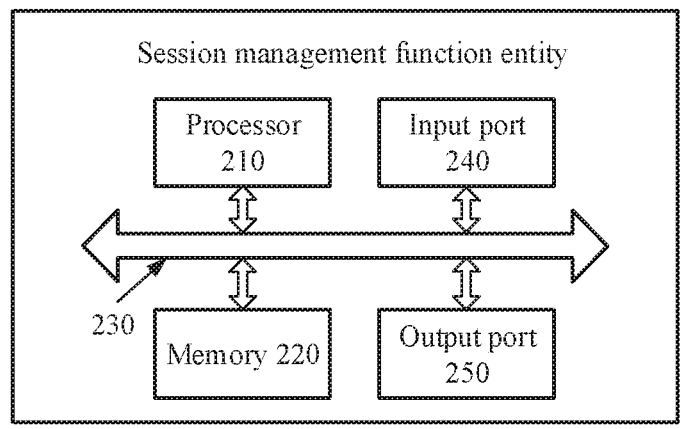
FIG. 11 is a schematic composition diagram of another session management function entity according to an embodiment of this application.

FIG. 11 is a schematic composition diagram of another session management function entity according to an embodiment of this application. The session management function entity may include a processor 210, a memory 220, and a bus 230. The processor 210 and the memory 220 are connected by using the bus 230. The memory 220 is configured to store an instruction. The processor 210 is configured to execute the instruction stored in the memory 220, to implement operations of the session management function entity in the methods corresponding to FIG. 2 to FIG. 4.

The session management function entity may further include an input port 240 and an output port 250. The processor 210, the memory 220, the input port 240, and the output port 250 may be connected by using the bus 230.

The processor 210 is configured to execute the instruction stored in the memory 220, to control the input port 240 to receive a signal, control the output port 250 to send a signal, and complete the steps performed by the session management function entity in the foregoing methods. The input port 240 and the output port 250 may be a same physical entity or different physical entities. When the input port 140 and the output port 150 are the same physical entity, the input port 140 and the output port 150 may be collectively referred. to as an input/output port. The memory 220 may be integrated in the processor 210, or may he disposed separately from the processor 210.

In an implementation, it may be considered that functions of the input port 240 and the output port 250 are implemented by using a transceiver circuit or a dedicated transceiver chip. It may be considered to implement the processor 210 by using a dedicated processing chip, a processing circuit, a processor, or a general-purpose chip.

In another implementation, it may be considered to implement the apparatus provided in this embodiment of this application by using a general-purpose computer. To be specific, program code that is used to implement functions of the processor 210, the input port 240, and the output port 250 is stored in the memory, and a general-purpose processor implements the functions of the processor 210, the input port 240, and the output port 250 by executing the code in the memory.

For concepts, explanations, detailed descriptions, and other steps of the session management function entity that are related to the technical solutions provided. in this embodiment of this application, refer to the descriptions of the content in the foregoing methods or other embodiments. Details are not described herein again.

A person skilled in the art may understand that, for ease of description, FIG. 9 and FIG. 11 show only one memory and only one processor. Actually, a controller may include a plurality of processors and a plurality of memories. The memory may also be referred to as a storage medium, a storage device, or the like. This is not limited in this embodiment of this application.

It should be understood that in the embodiment of this application, the processor may be a central processing unit ("CPU"), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

The bus may further include a power bus, a control bus, a status signal bus, and the like, in addition to a data bus. However, for clear description, various types of buses in the figures are marked as the bus.

In an implementation process, steps in the foregoing methods can be implemented by using a hardware integrated logical circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

According to the methods provided in the embodiments of this application, an embodiment of this application further provides a data transmission system, including the foregoing UPF and base station. For specific composition and functions, refer to related descriptions and illustration of FIG. 8 and FIG. 10. Details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with illustrative logical blocks and steps described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, The indirect couplings or communication connections between the apparatuses or units may be implemented in electronic, mechanical, or other forms.

All or some of the foregoing embodiments may be implemented. by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
  obtaining, by a communications apparatus, a correspondence between a quality of service flow identifier of a service flow and an inter-packet time interval of the service flow, wherein the correspondence indicates a corresponding relationship between the quality of service flow identifier and the inter-packet time interval;
  establishing, by the communications apparatus based on the correspondence, a gate queue used to send a particular data packet;
  establishing a mapping relationship between the gate queue and the quality of service flow identifier;
  receiving, by the communications apparatus, a data packet from an upper-level sending device of a transmission link; and
  if the data packet comprises the quality of service flow identifier, periodically scheduling, by the communications apparatus, the data packet based on the gate queue to which the quality of service flow identifier is mapped.

2. The method according to claim 1, wherein the communications apparatus is a user plane function entity, the upper-level sending device is a base station, and the data packet is an uplink data packet, and wherein obtaining, by the communications apparatus, the correspondence between the quality of service flow identifier of the service flow and the inter- packet time interval of the service flow comprises:
  receiving, by the communications apparatus, the correspondence from a session management function entity.

3. The method according to claim 1, wherein the communications apparatus is a base station, the upper-level sending device is a user plane function entity, and the data packet is a downlink data packet.

4. The method according to claim 3, wherein if base station handover is to be performed and the base station is a source base station during the base station handover, the obtaining, by the communications apparatus, the correspondence between the quality of service flow identifier of the service flow and the inter-packet time interval of the service flow comprises:
  receiving, by the source base station, the correspondence from an access and mobility management function entity, and wherein the method further comprises:
  sending, by the source base station, the correspondence to a target base station.

5. The method according to claim 3, wherein if base station handover is to be performed and the base station is a target base station during the base station handover, obtaining, by the communications apparatus, the correspondence between the quality of service flow identifier of the service flow and the inter-packet time interval of the service flow comprises:
  receiving, by the target base station, the correspondence from a source base station.

6. The method according to claim 1, further comprising:
  obtaining, by a session management function entity, subscription information of a terminal device from a unified data management entity, wherein the subscription information comprises the inter-packet time interval of the service flow;
  allocating, by the session management function entity, the quality of service flow identifier to the service flow;
  establishing the correspondence between the quality of service flow identifier and the inter-packet time interval; and
  sending, by the session management function entity, the correspondence to the communications apparatus, wherein the correspondence is used to periodically schedule the data packet.

7. The method according to claim 6, wherein the communications apparatus is a base station, and wherein sending, by the session management function entity, the correspondence to the communications apparatus comprises:
  sending, by the session management function entity, the correspondence to the base station through an access and mobility management function entity.

8. The method according to claim 6, wherein the communications apparatus is a user plane function entity.

9. The method according to claim 8, wherein the user plane function entity is a target user plane function entity, and before sending, by the session management function entity, the correspondence to the communications apparatus, the method further comprises:
  receiving, by the session management function entity from an access and mobility management function entity, a request for reselecting a user plane function entity; and
  selecting, by the session management function entity, the target user plane function entity, wherein sending, by the session management function entity, the correspondence to the communications apparatus comprises:
  sending, by the session management function entity, the correspondence to the target user plane function entity.

10. A communications apparatus, comprising:
  at least one processor;
  a non-transitory computer-readable storage medium coupled to the at least one processor and storing programming instructions for execution by the at least one processor, wherein the programming instructions instruct the at least one processor to:
    obtain a correspondence between a quality of service flow identifier of a service flow and an inter-packet time interval of the service flow, wherein the correspondence indicates a corresponding relationship between the quality of service flow identifier and the inter-packet time interval;
    establish, based on the correspondence, a gate queue used to send a particular data packet;
    establish a mapping relationship between the gate queue and the quality of service flow identifier;
    receive a data packet from an upper-level sending device of a transmission link; and
    if the data packet comprises the quality of service flow identifier, periodically schedule the data packet based on the gate queue to which the quality of service flow identifier is mapped.

11. The communications apparatus according to claim 10, wherein the communications apparatus is a user plane function entity, the upper-level sending device is a base station, and the data packet is an uplink data packet, and wherein the programming instructions further instruct the at least one processor to:
  receive the correspondence from a session management function entity.

12. The communications apparatus according to claim 10, wherein the communications apparatus is a base station, the upper-level sending device is a user plane function entity, and the data packet is a downlink data packet.

13. The communications apparatus according to claim 12, wherein if base station handover is to be performed and the base station is a source base station during the base station handover, the programming instructions further instruct the at least one processor to:

receive the correspondence from an access and mobility management function entity; and send the correspondence to a target base station.

14. The communications apparatus according to claim 12, wherein if base station handover needs to be performed and the base station is a target base station during the base station handover, the programming instructions further instruct the at least one processor to receive the correspondence from a source base station.

15. A session management function entity, comprising:

at least one processor;

a non-transitory computer-readable storage medium coupled to the at least one processor and storing programming instructions for execution by the at least one processor, wherein the programming instructions instruct the at least one processor to:

obtain subscription information of a terminal device from a unified data management entity, wherein the subscription information comprises an inter-packet time interval of a service flow;

allocate a quality of service flow identifier to the service flow;

establish a correspondence between the quality of service flow identifier and the inter-packet time interval, wherein the correspondence indicates a corresponding relationship between the quality of service flow identifier and the inter-packet time interval; and send the correspondence to a communications apparatus, wherein the correspondence is used to periodically schedule a data packet.

16. The session management function entity according to claim 15, wherein the communications apparatus is a base station, and wherein the programming instructions instruct the at least one processor to:

send the correspondence to the base station through an access and mobility management function entity.

17. The session management function entity according to claim 15, wherein the communications apparatus is a user plane function entity.

18. The session management function entity according to claim 17, wherein the user plane function entity is a target user plane function entity, and before sending the correspondence to the communications apparatus, the programming instructions further instruct the at least one processor to:

receive, from an access and mobility management function entity, a request for reselecting a user plane function entity;

select the target user plane function entity; and send the correspondence to the target user plane function entity.

* * * * *